(12) United States Patent
Paris et al.

(10) Patent No.: US 10,108,884 B2
(45) Date of Patent: Oct. 23, 2018

(54) LEARNING USER PREFERENCES FOR PHOTO ADJUSTMENTS

(71) Applicant: ADOBE SYSTEMS INCORPORATED, San Jose, CA (US)

(72) Inventors: Sylvain Paris, Jamaica Plain, MA (US); Durga Ganesh Grandhi, Vizianagaram (IN); Srinivasa Madhava Phaneendra Angara, Noida (IN); Robert Land Gager, Cupertino, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 12 days.

(21) Appl. No.: 15/154,796

(22) Filed: May 13, 2016

(65) Prior Publication Data
US 2016/0253578 A1  Sep. 1, 2016

Related U.S. Application Data

(63) Continuation of application No. 14/047,735, filed on Oct. 7, 2013, now Pat. No. 9,361,666.

(51) Int. Cl.
*G06K 9/00* (2006.01)
*G06K 9/62* (2006.01)
(Continued)

(52) U.S. Cl.
CPC ......... *G06K 9/6254* (2013.01); *G06K 9/6202* (2013.01); *G06K 9/6215* (2013.01);
(Continued)

(58) Field of Classification Search
None
See application file for complete search history.

(56) References Cited

U.S. PATENT DOCUMENTS 7,516,417 B2 *  4/2009  Amador .............. A61B 6/465
                                                   345/594
8,103,094 B2     1/2012  Wilensky
                 (Continued)

OTHER PUBLICATIONS

Elaine Weinmann and Peter Lourekas, Photoshop 6 for Windows and Macintosh, 2001.*
(Continued)

*Primary Examiner* — Mark Roz
(74) *Attorney, Agent, or Firm* — Shook, Hardy & Bacon, L.L.P.

(57) ABSTRACT

In example embodiments, systems and methods for learning and using user preferences for image adjustments are presented. In example embodiments, a new image is received. A correction parameter based on previously stored user adjustments for similar images is determined. A user style that is an adjusted version of the new image is generated by applying the correction parameter. The user style is provided on a user interface. A user adjustment is received. Based on determining that a user sample image is within a predetermined threshold of closeness to the new image, data corresponding to the user sample image is replaced with new adjustment data for the new image in a database of user sample images used to generate the correction parameter. Based on determining that no user sample images are within the predetermined threshold of closeness, new adjustment data is appended to the database used to generate the correction parameter.

20 Claims, 7 Drawing Sheets

(51) Int. Cl.
*G06T 5/00* (2006.01)
*G06T 5/50* (2006.01)
(52) U.S. Cl.
CPC .................. *G06T 5/00* (2013.01); *G06T 5/50* (2013.01); *G06T 2200/24* (2013.01); *G06T 2200/28* (2013.01); *G06T 2207/20081* (2013.01)

(56) References Cited

U.S. PATENT DOCUMENTS

| | | | |
|---|---|---|---|
| 8,214,766 | B1 | 7/2012 | Berger et al. |
| 9,195,909 | B2 | 11/2015 | Paris |
| 9,361,666 | B2 | 6/2016 | Paris et al. |
| 2007/0177779 | A1* | 8/2007 | Dennison .......... G06K 9/42 382/128 |
| 2011/0113361 | A1 | 5/2011 | Bhatt et al. |
| 2012/0054686 | A1 | 3/2012 | Joo et al. |
| 2012/0106848 | A1 | 5/2012 | Greig et al. |
| 2014/0071148 | A1 | 3/2014 | Webb et al. |
| 2014/0355821 | A1 | 12/2014 | Solem et al. |

OTHER PUBLICATIONS

LoCascio, Ted. My Adobe Photoshop Lightroom 4. Que Publishing, 2012.
Evening, Martin. The Adobe Photoshop Lightroom 4 Book: The Complete Guide for Photographers. Adobe Press, 2012. (uploaded in two parts).
Author Unknown, "PhotoImpact® XL User Guide", Ulead Systems, Inc., Aug. 2003, 294 pages. (uploaded in two parts).
First Action Interview Preinterview Communication dated Mar. 17, 2015 in U.S. Appl. No. 14/034,194, 5 pages.
First Action Interview Office Action dated May 28, 2015 in U.S. Appl. No. 14/034,194, 5 pages.
First Action Interview Preinterview Communication dated Jul. 16, 2015 in U.S. Appl. No. 14/034,259, 5 pages.
Notice of Allowance dated Jul. 17, 2015 in U.S. Appl. No. 14/034,194, 11 pages.
First Action Interview Preinterview Communication dated Sep. 10, 2015 in U.S. Appl. No. 14/047,735, 5 pages.
First Action Interview Office Action dated Sep. 22, 2015 in U.S. Appl. No. 14/034,259, 17 pages.
First Action Interview Office Action dated Oct. 15, 2015 in U.S. Appl. No. 14/047,735, 8 pages.
Notice of Allowance dated Feb. 10, 2016 in U.S. Appl. No. 14/047,735, 8 pages.
Final Office Action dated Mar. 24, 2016 in U.S. Appl. No. 14/034,259, 16 pages.
Non-Final Office Action dated Sep. 23, 2016 in U.S. Appl. No. 14/876,223, 11 pages.
Non-Final Office Action dated Jan. 26, 2017 in U.S. Appl. No. 14/034,259, 20 pages.
Notice of Allowance dated Apr. 20, 2017 in U.S. Appl. No. 14/876,223, 8 pages.
Non-Final Office Action dated Mar. 28, 2018 in U.S. Appl. No. 14/034,259, 20 pages.

* cited by examiner

LEARNING USER PREFERENCES FOR PHOTO ADJUSTMENTS

CROSS-REFERENCE TO RELATED APPLICATIONS

This application is a continuation of, and claims priority to, U.S. patent application Ser. No. 14/047,735, filed Oct. 7, 2013, entitled "LEARNING USER PREFERENCES FOR PHOTO ADJUSTMENTS" which is incorporated herein by reference in its entirety.

BACKGROUND OF THE INVENTION

Conventionally, correction algorithms for image processing cannot be customized to a user's preferences. For example, current image processing systems may allow the user to select an auto adjust indicator which may adjust the image to a particular preset adjustment without allowing the user to select an option in between the preset adjustment and the original image. Additionally, the preset adjustment is typically a generic adjustment that does not take user preferences or content of an input image into consideration.

BRIEF DESCRIPTION OF THE SEVERAL VIEWS OF THE DRAWING

Various ones of the appended drawings merely illustrate example embodiments of the present invention and cannot be considered as limiting its scope.

DETAILED DESCRIPTION OF THE INVENTION

The description that follows includes systems, methods, techniques, instruction sequences, and computing machine program products that exemplify illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

In example embodiments, systems and methods for learning and using user preferences for image adjustments are presented. In example embodiments, a new image is received. A correction parameter based on previously stored user adjustments for similar images is determined. A user style that is an adjusted version of the new image is generated by applying the correction parameter. The user style is provided on a user interface. A user adjustment is received. Based on determining that a user sample image is within a predetermined threshold of closeness to the new image, data corresponding to the user sample image is replaced with new adjustment data for the new image in a database of user sample images used to generate the correction parameter. Based on determining that no user sample images are within the predetermined threshold of closeness, new adjustment data is appended to the database used to generate the correction parameter.

Figure 1:
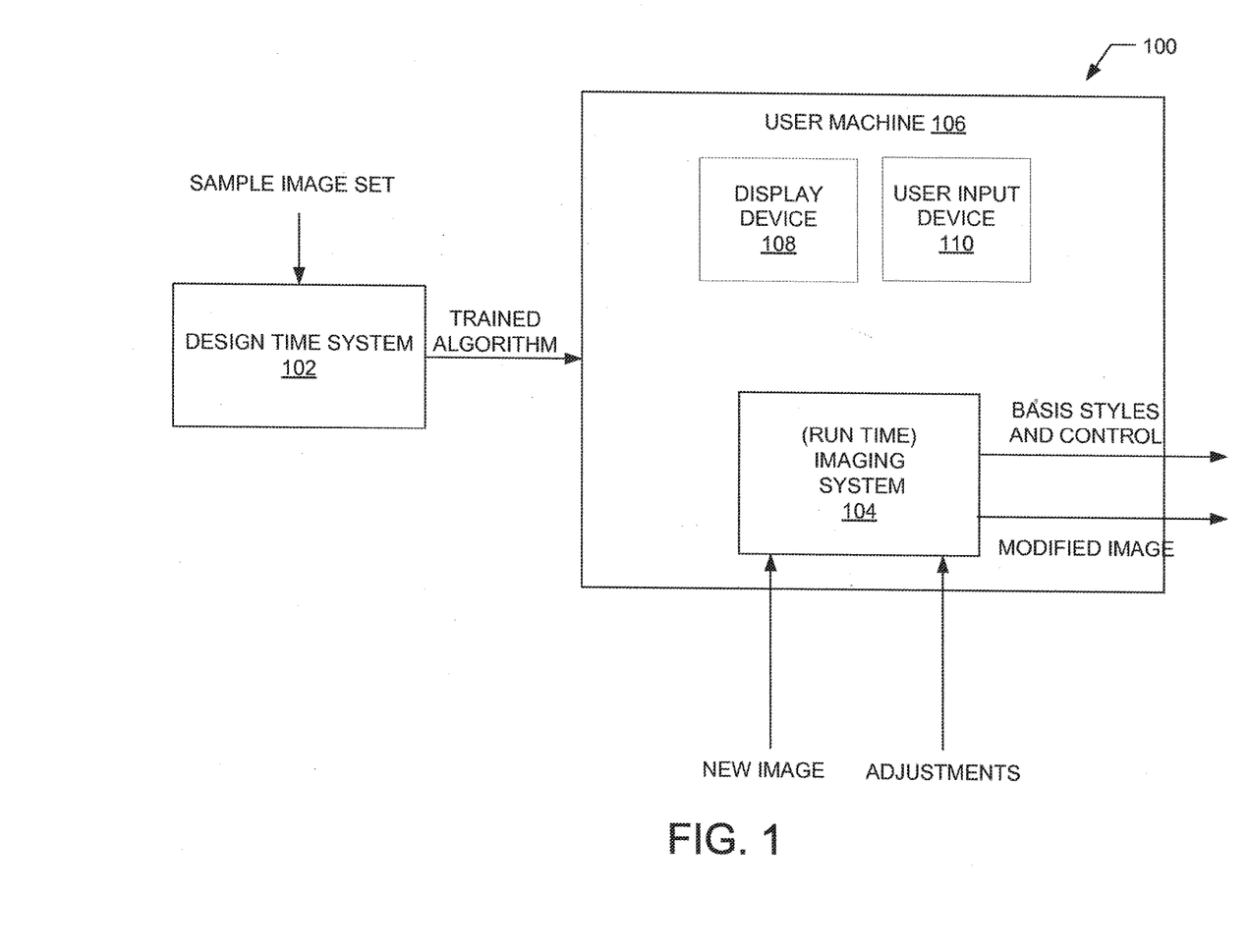
FIG. 1 is a block diagram of an example environment in which embodiments of the present invention may be utilized.

With reference to FIG. 1, an example environment 100 in which embodiments of the present invention may be utilized is shown. A design time system 102 generates a plurality of machine-learned data based on a sample image set. For example, the sample set may comprise a large number of sample images (e.g., 250 images) that are each adjusted by hand to provide "extreme" adjusted versions as well as a "good" version (e.g., from the perspective of a professional photographer) of the image. For instance, each image may be adjusted to provide versions having the lowest contrast, brightness, sharpness, or saturation as well as corresponding versions having highest contrast, brightness, sharpness, or saturation. If the design time system 102 desires to train an algorithm for a two-dimensional adjustment (e.g., involving two different image controls), the samples may include extreme versions of these combinations of image controls. For example, each sample may be adjusted to provide a lowest brightness/lowest contrast version, a lowest brightness/highest contrast version, a highest brightness/lowest contrast version, and a highest brightness/highest contrast version. It is contemplated that the image controls may be combined in any combination and corresponding versions of "extreme" sample images based on the combinations of the combined image controls used to train the algorithm in the design time system 102.

Each of these different versions of each sample image are provided to the design time system 102 and used to "train" an image adjustment algorithm such that the image adjustment algorithm can later on, for example, automatically generate "extreme" and "good" versions of new images based on what it has learned from the sample set of images. In other embodiments, the image adjustment algorithm may be trained to automatically generate versions of the new images that are not at the "extremes" (e.g., not at the lowest or highest image control value).

In the process of training the image adjustment algorithm, example embodiments determine image descriptors for each sample image. Image descriptors comprise a list of salient features of each sample image that are a summary of image features of each sample image. Examples of image features may include tonal information, color tone, number of faces, orientation of the image, or any other attributes that would assist in distinguishing one image from another image. These image descriptors are typically computed in a same manner. For instance, an element of an image descriptor is an average image brightness and another element of an image descriptor may be a number of faces detected in the image (e.g., using a face detection algorithm).

In some embodiments, the image adjustment algorithm "learns" or is trained by finding parameters of a covariance function. The covariance function may take two image descriptors as input and returns a number. If the number is low, it means that the two image descriptors correspond to unrelated images. However, if the number is high, the images are more related. Because this process is computationally expensive, the design time training may only occur once and the parameters of the covariance function do not change afterwards.

Once the design time system 102 completes training the algorithm, the trained algorithm and the machine-learned data may be stored to, accessed by, or associated with, a (runtime) imaging system 104 in a user machine 106. The learned data may comprise the set of reference images (also referred to as "reference dataset") along with data corresponding to the "extreme" versions and the "good" version of each sample image (also referred to as "reference image"). The "good" version of a sample image may be, for example, a version adjusted to what a professional photographer would consider ideal for the sample image. The data corresponding to the different versions includes adjustment parameters used to adjust the sample image to each of the different versions. In example embodiments, the trained algorithm may be transferred to the user machine 106 via a network (e.g., Internet, wide-area network, local area network) or using a tangible machine-readable storage device (e.g., CD-ROM).

In example embodiments, the imaging system 104 is configured to receive a new image from a user or operator of the user machine 106 and to apply the trained algorithm to the new image to provide basis styles of the new image to the user. Basis styles are versions of the new image using reference adjustments that are based on learned data (e.g., the adjustments made to the reference dataset). These basis styles are generated by the imaging system 104 based on content (e.g., new image descriptors) of the new image. Thus, two different new images will each result in different basis styles or reference points. A user style may also be provided to the user. The user style is a version of the new image based on past user adjustments made to similar images. The process for generating the basis styles and user style will be discussed in more detail below. It is noted that the terms "basis style" and "reference point" may be used interchangeably.

In one embodiment, the basis styles comprise "extreme" versions of the new image that the user can view and, in some cases, select an adjustment from or in between. For example, the basis styles for a new image may be versions of the image with lowest brightness and lowest contrast, lowest brightness and highest contrast, highest brightness and lowest contrast, and highest brightness and highest contrast. Additionally, a control mechanism may be presented to the user on a display device 108 along with the basis styles so that the user may select or adjust between the basis styles using a user input device 110. The control mechanism may comprise, for example, one or more sliders or a multi-directional control knob. These adjustments may be received by the imaging system 104 and a modified version of the image generated and presented. The process for using machine learning to define user controls that include the basis styles for image adjustments will be discussed in further detail below.

Additionally, the imaging system 104 applies user preferences learned from past adjustments performed by a user of the user machine 106 to similar images as the new image to generate the user style. For example, if the user prefers to have portraits at a brightness of 60 and contrast at 40, the imaging system 104 may automatically adjust a new image that is identified to be a portrait (based on image descriptors) to these values of the image controls. If the user decides to make further adjustments to the user style, the imaging system 104 captures the user adjustment and updates a user style database with the user adjustment.

The user machine 106 may comprise a mobile phone, laptop, tablet, or any other communication device (e.g., mobile device) that a user may utilize to view and adjust images such as photographs. While only one user machine 106 is shown in FIG. 1, it is noted that any number of user machines 106 of different users may be present in the environment 100. It is further noted that while example embodiments may discuss images in terms of photographs or pictures, example embodiments may be used to define user controls for any type of image data.

Figure 2:
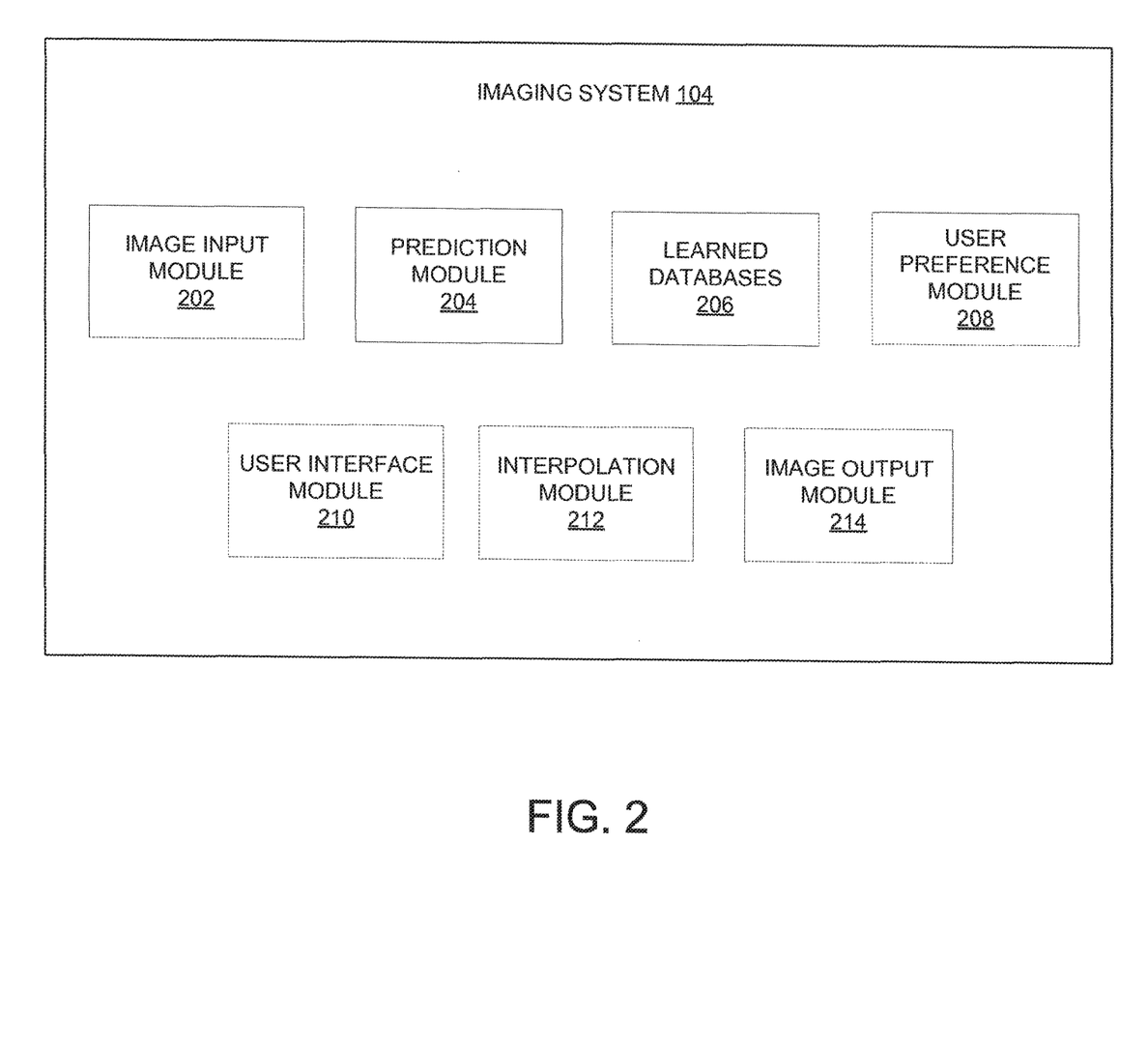
FIG. 2 is a block diagram illustrating an example embodiment of an imaging system.

Referring now to FIG. 2, the example imaging system 104 is shown in more detail. The imaging system 104 applies machine learning (e.g., trained algorithm and reference data) to new images to provide user controls for image adjustments. The imaging system 104 also uses learned user preferences and adjustments to automatically adjust the new images to the user's preferences as well as capture new adjustments performed by the user to update the learned user preferences. In one embodiment, a portion of the learned data from the design time system 102 may be averaged with and slowly replaced by the learned user preferences to customize the imaging system 104 to the user. To enable this process, the imaging system 104 may comprise an image input module 202, a prediction module 204, learned databases 206, a user preference module 208, a user interface module 210, an interpolation module 212, and an image output module 214 coupled in communication.

The image input module 202 receives the new image that is to be adjusted. In some cases, the new image may be accessed from an image capture device (e.g., a camera). Alternatively, the new image may be accessed from a storage device (not shown) on, or coupled to, the user machine 106.

Upon the user activating the imaging system 104 to adjust the new image, the prediction module 204 analyzes the new image and proposes a plurality of adjustments for the new image in a form of adjusted versions of the new image referred to as basis styles. In example embodiments, the prediction module 204 determines new image descriptors for the new image. Using the new image descriptors, the prediction module 204 accesses the learned databases 206 to compare the new image descriptors to image descriptors of reference images in the reference dataset. Thus, the learned database 206 may comprise a reference set database. Each reference image is assigned a weight that represents how similar the reference image is to the new image based on the comparison of the image descriptors. For example, the new image descriptors may indicate that the new image is of a sunset, and the reference images that are also sunsets are assigned a higher weight representing a stronger similarity.

In example embodiments, the prediction module 204 may determine how similar each reference image is by examining a reference dataset and ranking the reference images in the reference dataset based on a comparison of the image descriptors (e.g., how many or how close the image descriptors of the reference image matches the new image descriptors). As such, the reference images may be ranked between a value of zero (e.g., not related at all to the new image) to one (e.g., completely related to the new image). In other embodiments, some image descriptors may be more important than other image descriptors and the ranking of the reference images may be adjusted or weighted according.

In an alternative embodiment, the reference image having the closest set of image descriptors to those of the new image descriptors is determined to be a most similar image. For example, the new image descriptors may indicate that the new image is of a sunset and the reference image determined to be the most similar may also be a sunset. Once the most similar reference image is determined, the adjustment parameters (e.g., correction curve) applied to the reference image may be similarly applied to the new image to generate a plurality of basis styles.

In conventional systems, the image adjustments (e.g., brightness adjustment) are fixed. That is, the image adjustments for a particular image are predetermined for the new image regardless of its content. In contrast, the prediction module 204 analyzes the content of the image to determine the new image descriptors and uses the learned data from the reference dataset to determine what a particular image basis style or reference point may look like (e.g., a bright version of the new image should look like this and a dark version like this). Because the adjustment parameters are based on the content of the new images, the basis styles as well as the user style are different for each new image.

In some embodiments, the learned data is used to predict any number of image control adjustments by the prediction module 204. For example, the user may be allowed to adjust a combination of both the contrast and brightness using at least four basis styles (e.g., four "extreme" versions of the new image including one reference point for each combination of lowest and highest versions of the image control). In another example, the user may be allowed to adjust a combination of three image controls (e.g., contrast, brightness, and sharpness) using at least eight basis styles (e.g., one reference point for each combination of lowest and highest versions of the image control). For simplicity, example embodiments will be discussed herein using a combination of two image controls: brightness and contrast. However, it is contemplated that any number of one or more image controls of any image control type are applicable to example embodiments. An example process for generating the basis styles and the user style will be discussed in more detail in connection with FIG. 3 below.

The user preference module 208 determines a user style for the new image. The user style comprises an automatically generated version of the new image based on stored user adjustment parameters (also referred to as "correction parameters") in a user style database of the learned databases 206. The user adjustment parameters comprise previous user adjustments for other new images. For example, if the user prefers to have portraits at a brightness of 60 and contrast at 40, the user preference module 208 may automatically adjust a new image that is determined to be a portrait (based on image descriptors) to these values of the image controls. In one embodiment, the correction parameters are in a form of two-dimensional coordinates signifying points in a basis style coordinate system.

In some embodiments, the user preference module 208 may take the new image descriptors and compare the new image descriptors to image descriptors stored in the user style database. The user preference module 208 may assign a weight to each learned user sample using an inverse covariance matrix. The more similar the user sample is to the new image, the higher the weight. Using a weight vector, a weighted sum (or weighted average of correction parameters is computed. The result may be the adjustment that is to be applied to the new image to generate the user style.

In some embodiments, the data corresponding to each reference image may include adjustment parameters for "extreme" versions of each reference image as well as user preference data that corresponds to the one or more user adjustment parameters. For example, a reference image may point to one or more learned user samples (e.g., previous new images adjusted by the user) in the user style database. Alternatively, the data corresponding to each reference image may include the corresponding learned user sample data and/or user adjustment parameters.

The user adjustment parameters correspond to one or more previous manual adjustments made by the user for similar new images (e.g., having the same or most similar image descriptors as a current new image). The user adjustments parameters are stored to the learned databases 206. In one embodiment, the user adjustment parameter(s) may be averaged (or weighted) with the "good" adjustment parameter (e.g., corresponding to the "good" version of the reference image), but as more consistent user adjustment parameters are associated with the reference image, the "good" adjustment parameter may be replaced or made negligible by the user adjustment parameters. In other embodiments, the good adjustment parameters of the reference images may not be used.

At some point, the number of user adjustment parameters and/or user sample images in the user style database may become quite large, thus slowing processing by the imaging system 104. As such, the user preference module 208 may compensate by replacing or removing oldest adjustment parameters and/or user sample images with newer adjustment parameters and/or newer user sample images. This user style database update process will be discussed in more detail in connection with FIG. 6 below.

The user interface module 210 provides a user interface on which the basis styles and the user style may be presented to the user. In one embodiment, the basis styles and user style may be presented graphically as different versions of the new image. For example, versions of the new image with various combinations of low and high brightness and contrast may be presented to the user. In another example, the basis styles and user style may be presented as a value on a slider or other control mechanism with which the user may make adjustments. For instance, the user may not like a version of the user style, but would like a version in between the user style and one of the basis styles. The user may indicate this adjustment using the control mechanism.

The interpolation module 212 may receive the adjustment indicated using the control mechanism and adjust the new image accordingly (e.g., generate a new user style). As discussed above, the prediction module 204 may generate at least four basis styles for the different combinations of adjustments made to contrast and brightness as well as a user style. In order to determine an adjusted style or reference point between the basis styles and/or the user style, the interpolation module 212 interpolates between these styles. For example, if the basis styles correspond to reference points that are 0 and 100 (e.g., in terms of brightness), then the interpolation module 212 may interpolate between the styles to determine an adjusted reference point of, for example, 40 (e.g., in terms of brightness).

It is contemplated that the basis styles do not need to be the "extremes" of the image control. For example, the basis styles may be at 20 and 80 for an image control. In these embodiments, the interpolation module 212 may extrapolate using the two basis styles. For example if the basis styles are 20 and 80 for an image control, the interpolation module 212 may extrapolate to obtain an adjusted reference point at 10.

It is also contemplated that any two or more basis styles may be generated by the prediction module 204. For example, the prediction module 204 may generate a lowest, highest, and middle adjustment parameter basis styles for the new image. Using more basis styles may provide a more precise adjustment when interpolating or extrapolating to obtain an adjusted reference point or style.

The image output module 214 outputs a final image to the user. In some embodiments, the user may continually adjust the new image until they arrive at a final image to their liking. The user may then indicate (e.g., selecting an "OK" button) that the final image is approved. The image output module 214 may save this final image (e.g., to a local or coupled storage device) and provide a clean full screen version of the final image to a display device 108 of the user machine 106 (e.g., remove the basis styles from the user interface). Additionally, when the final image is approved, the user adjustment may be used to update the learned databases 206.

Figure 3:
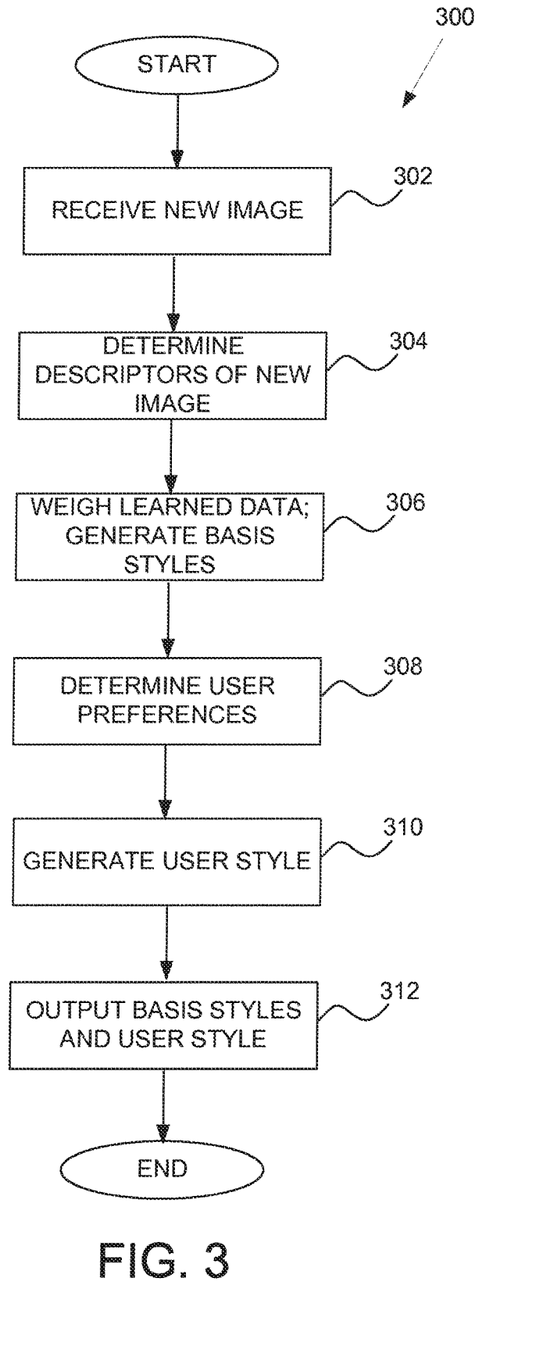
FIG. 3 is a flow diagram of an example high-level method for using machine learning to automatically adjust a new image based on user preferences.

FIG. 3 is a flow diagram of an example high-level method 300 for using machine learning to define user controls for image adjustments. The operations of the method 300 are performed at the user machine 106 during runtime. As such, a user may provide one or more images (referred to as "new images") to the imaging system 104 for adjustment. The images are "new" in the sense that the imaging system 104 has never "seen" the images before. In operation 302, the imaging system 104 receives a new image to be adjusted. Accordingly, the image input module 202 may be coupled to a camera or a storage device and accesses/receives the new image.

In operation 304, the image descriptors are determined for the new image. In example embodiments, the prediction module 204 analyzes the new image to determine the new image descriptors (e.g., position of average pixel, ISO settings, number of faces, color tone, etc.) of the new image. In one example, there may be 150 image descriptors used by the prediction module 204 to "identify" the image or image type (e.g., a portrait, a sunset).

Using the new image descriptors, the prediction module 204 weights the learned data in operation 306. In example embodiments, the prediction module 204 accesses the learned database 206 to compare the new image descriptors to image descriptors of the reference dataset. In one embodiment, each reference image in the reference dataset is assigned a weight representing how similar the reference image is to the new image. In alternative embodiments, other mechanisms may be used to compare the new image and the reference dataset to determine the reference image that is most similar to the new image (e.g., selecting a reference image having the closest set of image descriptors to those of the new image descriptors).

Once the weight of each reference image in the reference dataset is determined, weighted averages of one or more adjustment parameters applied to the reference images (based on the weight applied to each reference image) may be similarly applied to the new image to generate basis styles of the new image. For example, the weighted averages of the adjustment parameters corresponding to the extreme versions of the reference images may be applied to the new image to generate extreme versions of the new image (e.g., basis styles of the new image). It is noted that in example embodiments, the adjustment parameters of the reference dataset are not affected by any user adjustments.

In operation 308, user preferences are determined. In example embodiments, the new image descriptors are used to find and weigh user sample images and their corresponding correction parameters in the user style database. If the user has made user adjustments in the past for new images that were adjusted, these user adjustments (e.g., correction parameters) are stored along with image descriptors of the previous new images (referred to as "user sample images").

In an alternative embodiment, the user adjustments are stored with the adjustment parameters of the reference image. In one embodiment, a covariance function may be used to estimate the new image's relationship to every sample image in the user style database. This comparison provides a covariance vector, which may be multiplied by an inverse of a covariance matrix to obtain a set of weights. There is one weight for each user sample image of the sample dataset: zero means the sample image is unrelated and one means the sample image is highly related to the new image.

In operation 310, a user style may be generated using the weighted user adjustments (e.g., weighted based on the weight assigned based on the image descriptors). In a first iteration (e.g., a first time the reference image is selected by the prediction module 204), the user style may be the good style that is based on the reference image since there are no user preferences stored yet. However, as the user provides more user adjustments to the imaging system 104, the user adjustments may be averaged (in some cases, along with the adjustment parameter for the good version of the reference image). Thus, over time, the imaging system 104 may be trained to the user's preferences. As a result, the user style for the new image may eventually be generated that does not need to be adjusted by the user.

In operation 312, the basis styles and the user style are output via a user interface by the user interface module 210. In one example, the user style may be positioned centered on the user interface and the basis styles positioned in corners of the user interface according to their adjustments.

Figure 4:
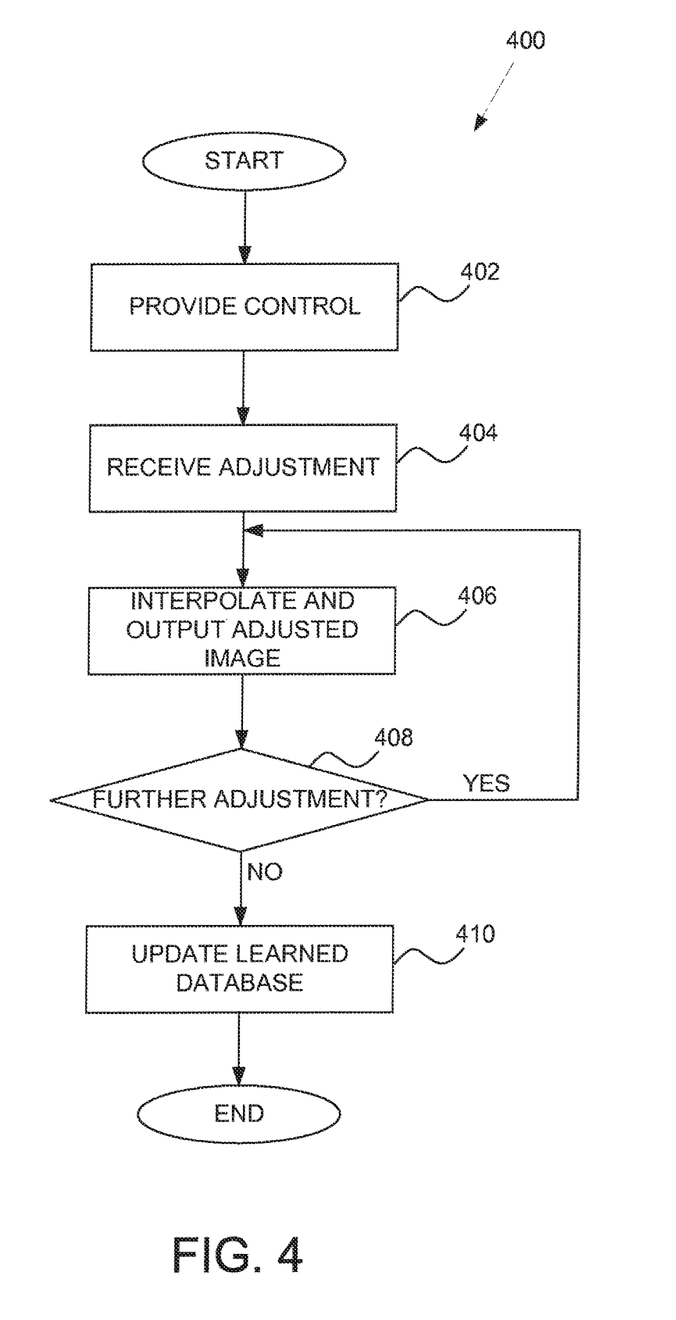
FIG. 4 is a flow diagram of an example high-level method for revising a user style of the new image.

FIG. 4 is a flow diagram of an example high-level method 400 for revising a user style of the new image. In operation 312, the basis styles and the user style are output to a user interface. In operation 402, a control mechanism is provided on the user interface to allow the user to adjust the user style. It is noted in that in some embodiments, operations 312 and 402 may be combined into a single operation.

Figure 5:
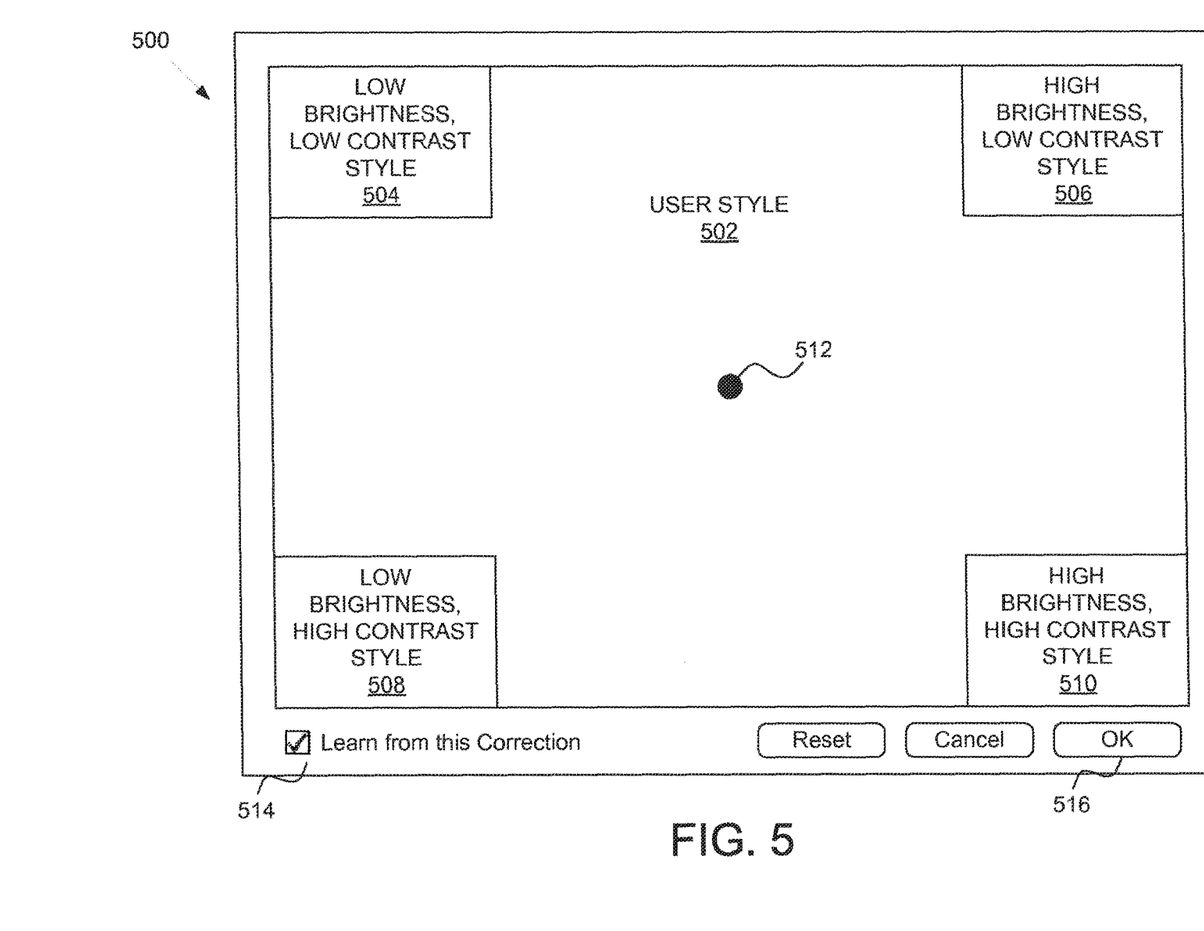
FIG. 5 is an example user interface for adjusting an image.

FIG. 5 is an example user interface 500 for adjusting an image. A user style 502 is presented in a center portion of the user interface 500. Each of the basis styles 504-510 is overlaid over corners of the user style 502 according to their respective image control adjustments. For instance, brightness increases from left to right and contrast decreases from a bottom of the user interface 500 to a top of the user interface 500. As such, the basis style 504 with low brightness and low contrast is positioned in a top left corner of the user interface 500, while the basis style 510 for high brightness and high contrast is positioned in the bottom right corner of the user interface 500.

In one embodiment, the basis styles 504-510 are presented in a basis style coordinate system. As such, style corrections may be derived from a linear combination of the basis styles 504-510. Each point (x,y) in the basis style coordinate system represents a new style of correction which is a linear combination of the basis styles 504-510.

A control mechanism 512 is provided on the user style 502. The control mechanism's location on the user interface 500 represents a current set of correction parameters or adjustment parameters. The control mechanism 512 may be moved around to fine tune or adjust the user style 502. The basis styles 504-510 indicate a correction that the user will obtain if the user drags the control mechanism 512 in a particular direction towards one of the basis styles 504-510. Returning to FIG. 4, a user adjustment resulting from the movement of the control mechanism 512 is received in operation 404.

In operation 406, the interpolation module 212 interpolates using at least two styles (e.g., user style and/or basis styles 504-510) to determine a new user style to output. The interpolation module 212 may receive the user adjustment indicated using the control mechanism 512 and adjust the new image or user style accordingly (e.g., generate an adjusted style or reference point). For example, if the basis styles 504-510 correspond to extremes of 0 and 100 for the various combinations of image controls and the user style 502 corresponds to 50 for both image controls, then the interpolation module 212 may interpolate between the styles 502-510 to determine the adjusted reference point of, for example, 40 brightness and 60 contrast. It is contemplated that the basis styles 504-510 do not need to be the "extremes" of the image control, and the interpolation module 212 may extrapolate using two of the basis styles 504-510 and/or the user style 502. The adjusted reference point or adjusted style may then be output on the user interface 500 in place of the user style 502.

In operation 408, a determination is made as to whether further adjustments are made. It is noted that the refining of the user style to the adjusted style may occur substantially in real time. That is, as the user is moving the control mechanism 512 around the user interface 500, the adjusted style may be updated in the center portion of the user interface 500. This occurs as the interpolation module 212 continuously interpolates (or extrapolates) using at least two styles 502-510 and outputs an adjusted style.

If further amendments are made, the method 400 returns to operation 406. However, if no further adjustments are made and the user approves the adjusted style, then in operation 410, the learned databases 206 (e.g., user style database) may be updated with the new user adjustment (e.g., control parameter) as well as image descriptor for the new image. In one embodiment, a checkbox 514 may be provided that instructs the imaging system 104 to learn from the present user adjustment to the new image. As such, when the user finalizes a position of the control mechanism 512 on the user interface 500 and selects an approval button 516 (e.g., "OK" button) to approve the new image, the present user adjustment is stored to the learned databases 206 and used to update the user preference data in the user style database. The update process will be discussed in more detail in connection with FIG. 6. In example embodiments, upon approval, the adjustments are made to the new image and saved.

While example embodiments discuss the use of image descriptors to identify the images, it is noted that other mechanisms may be used. For example, a snapshot of the new image may be captured and stored to identify the new image. However, storing these snapshots may be difficult as more and more adjustments are made. By using image descriptors, less dimensional space is needed for storage of the image. Additionally, a Euclidean distance between two image descriptors provides a good measure of similarity between their corresponding images. The smaller a distance, the more similar the images are to each other. Since an image descriptor contains only the salient information of the image, doing away with unimportant parts of it, this may give a measure of similarity better than image-to-image comparison.

Figure 6:
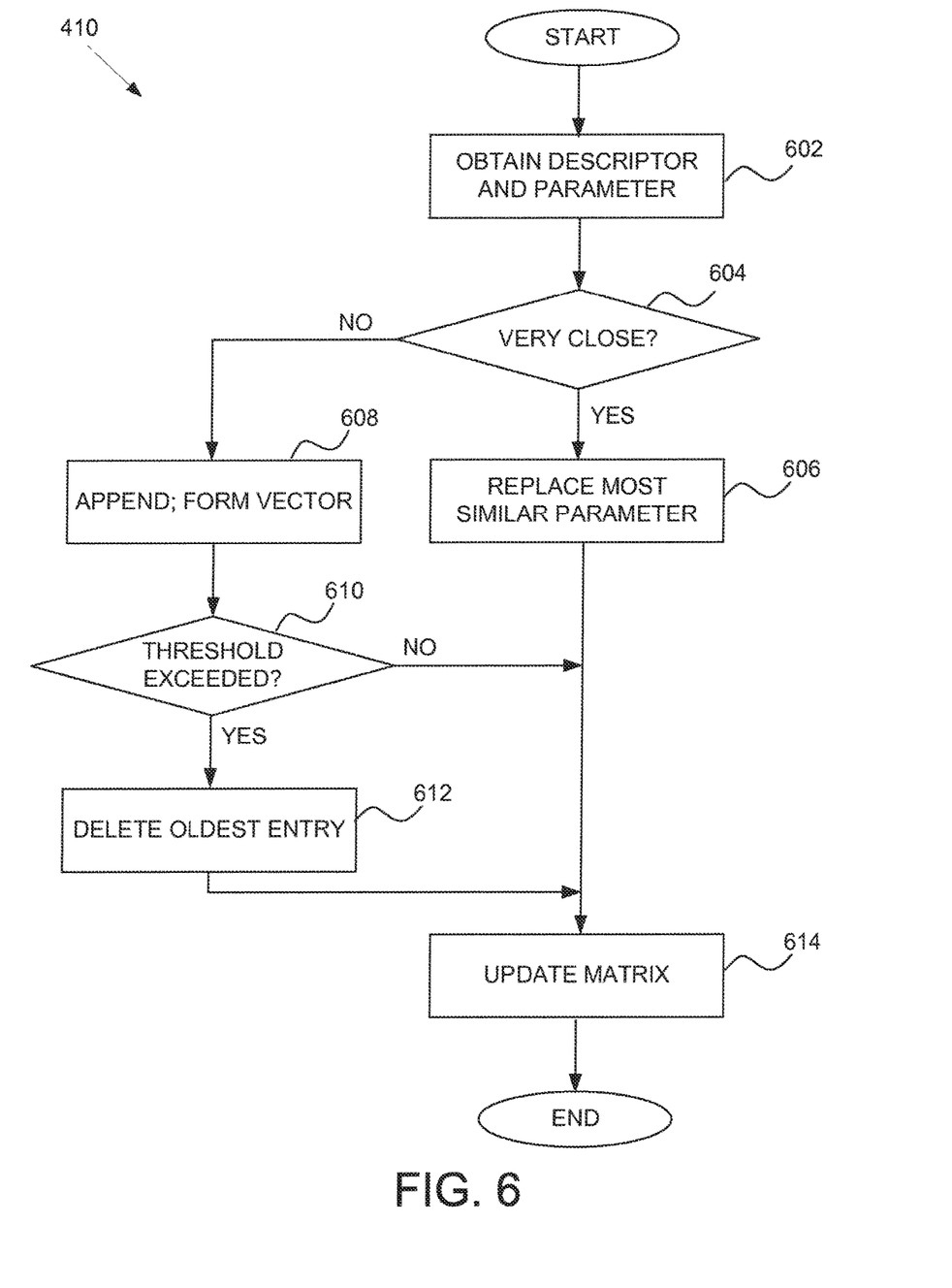
FIG. 6 is a diagram of an example high-level method for managing a size of a learned data set.

FIG. 6 is a diagram of an example high-level method 600 for managing a size of the user style database (or stored user control parameters and user sample images). In order to maintain similarity across user sample images, the similarity of each user sample image with every other sample is maintained in a covariance matrix (C), where each element $C(i,j)$ represents the similarity of $i^{th}$ user sample image to $j^{th}$ user sample image. In example embodiments, an inversion of the covariance matrix is used in generating the user style as discussed above. However, as more user sample images and corresponding data are stored to the user style database, computation of an adjusted style may be slowed. As such, the user style database may be constrained to a limited number of user sample images (e.g., 250).

In operation 602, the image descriptor ($f_i$) and parameter adjustments ($a_i$) for the new image which has been adjusted by the user (herein referred to as "new sample") are obtained. For example, the user preference module 208 may obtain these values from the prediction module 204.

In operation 604, a determination is made as to whether a stored user sample image is very close to the new sample (e.g., within a predetermined threshold of closeness). In one embodiment, for each image descriptor ($f_i$) present in the user style database, a distance $d_{ij}$ is computed. If $d_{ij}$ is very close to zero, then the adjustments for the new sample is determined to be learned from a previously stored user sample image. In this case, the previously stored adjustment parameter for $f_j$ with $d_{ij}$ closest to zero may be replaced with the new adjustment parameters in operation 606.

If there are no stored user sample images for which $d_{ij}$ is close to zero, then in operation 608, the image descriptors $f_i$ and the adjustment parameters $a_i$ are appended to the user style database. In one embodiment, the image descriptors $f_i$ are appended to a list of image descriptors while the adjustment parameters $a_i$ are appended to a list of adjustment parameters in the user style database. Furthermore, a vector $v_i$ may be formed from all the $d_{ij}$'s computed in operation 604.

In operation 610, a determination is made as to whether a threshold number of user sample images stored in the user style database is exceeded. If the threshold is exceeded, then an oldest entry in the user style database (e.g., image descriptor list, adjustment parameter list) is deleted in operation 612.

In operation 614, the covariance matrix is updated. In example embodiments, using elements of $v_i$, a new row and new column may be added to a current covariance matrix. The updated covariance matrix is then inverted to obtain an updated inverse covariance matrix. This retrains the algorithm for the user style.

Figure 7:
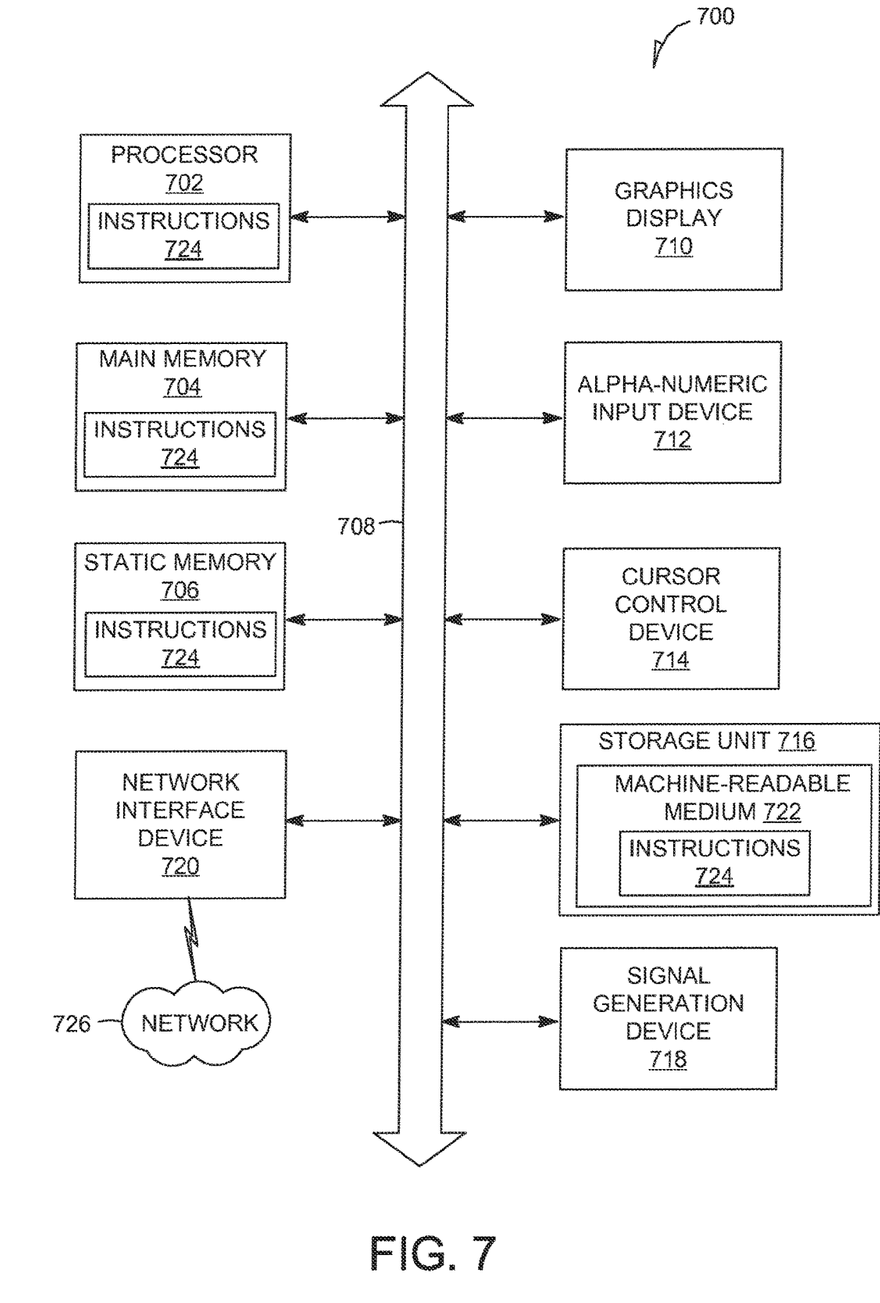
FIG. 7 is a simplified block diagram of a machine in an example form of a computing system within which a set of instructions for causing the machine to perform any one or more of the methodologies discussed herein may be executed.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system and within which instructions 724 (e.g., software, a program, an application, an applet, an app, or other executable code) for causing the machine 700 to perform any one or more of the methodologies discussed herein may be executed. In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724, sequentially or otherwise, that specify actions to be taken by that machine. Further, while only a single machine is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (A.SIC), a radio-frequency integrated circuit (RFIC), or any suitable combination thereof), a main memory 704, and a static memory 706, which are configured to communicate with each other via a bus 708. The machine 700 may further include a graphics display 710 (e.g., a plasma display panel (PUP), a light emitting diode (LED) display, a liquid crystal display (LCD), a projector, or a cathode ray tube (CRT)). The machine 700 may also include an alphanumeric input device 712 (e.g., a keyboard), cursor control device 714 (e.g., a mouse, a touchpad, a trackball, a joystick, a motion sensor, or other pointing instrument), a storage unit 716, a signal generation device 718 (e.g., a speaker), and a network interface device 720.

The storage unit 716 includes a machine-readable medium 722 on which is stored the instructions 724 embodying any one or more of the methodologies or functions described herein. The instructions 724 may also reside, completely or at least partially, within the main memory 704, within the processor 702 (e.g., within the processor's cache memory), or both, during execution thereof by the machine 700. Accordingly, the main memory 704 and the processor 702 may be considered as machine-readable media. The instructions 724 may be transmitted or received over a network 726 via the network interface device 720.

As used herein, the term "memory" refers to a tangible machine-readable medium able to store data temporarily or permanently and may be taken to include, but not be limited to, random-access memory (RAM), read-only memory (ROM), buffer memory, flash memory, and cache memory. While the tangible machine-readable medium 722 is shown in an example embodiment to be a single medium, the term "tangible machine-readable medium" should be taken to include a single medium or multiple media (e.g., a centralized or distributed database, or associated caches and servers) able to store instructions (e.g., instructions 724). The term "tangible machine-readable medium" shall also be taken to include any medium, or combination of multiple media, that is capable of storing instructions for execution by a machine (e.g., machine 700), such that the instructions, when executed by one or more processors of the machine (e.g., processor 702), cause the machine to perform any one or more of the methodologies described herein. Accordingly, a "tangible machine-readable medium" may refer to a single storage apparatus or device, as well as "cloud-based" storage systems or storage networks that include multiple storage apparatus or devices. The term "tangible machine-readable medium" shall accordingly be taken to include, but not be limited to, one or more data repositories in the form of a solid-state memory, an optical medium, a magnetic medium, or any suitable combination thereof. Furthermore, the tangible machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The instructions 724 may further be transmitted or received over a communications network 726 using a transmission medium via the network interface device 720 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMax networks). The term "transmission medium" shall be taken to include any intangible medium that is capable of storing, encoding, or carrying instructions 724 for execution by the machine 700, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A computer-implemented method, comprising:
   receiving an image to be adjusted;
   identifying, using a hardware processor, a correction parameter in a form of a point in a two-dimensional basis style coordinate system, the point in the two-dimensional basis style coordinate system representing previously stored user adjustments for a reference image similar to the image;
   generating an adjusted version of the image based on the correction parameter; and
   causing the adjusted version of the image to display in a user interface implementing the two-dimensional basis style coordinate system.

2. The method of claim 1, further comprising:
   identifying a location of the user interface based on the correction parameter; and
   causing to display a control mechanism on the location of the user interface, the control mechanism to facilitate user operations for further image adjustments on the adjusted version of the image.

3. The method of claim 2, further comprising:
receiving a user adjustment based on the control mechanism moved to another location on the two-dimensional basis style coordinate system;
generating another adjusted version of the image based on the user adjustment; and
causing to display the another adjusted version of the image on the user interface.

4. The method of claim 3, further comprising:
obtaining a summary of image features of the another adjusted version of the image as image descriptors of the another adjusted version of the image.

5. The method of claim 4, further comprising:
determining the another adjusted version of the image is not within a predetermined threshold of closeness to any stored user sample images in a reference dataset based on the image descriptors of the another adjusted version of the image; and
adding the another adjusted version of the image and adjustment parameters corresponding to the user adjustment to the reference dataset.

6. The method of claim 5, the adding comprises adding the image descriptors of the another adjusted version of the image to a list of image descriptors in the reference dataset, and adding the adjustment parameters corresponding to the user adjustment to a list of adjustment parameters in the reference dataset.

7. The method of claim 4, further comprising:
determining the another adjusted version of the image is within a predetermined threshold of closeness to at least one reference image in a reference dataset based on the image descriptors of the another adjusted version of the image; and
replacing adjustment parameters associated with the at least one reference image with adjustment parameters corresponding to the user adjustment.

8. The method of claim 7, wherein the determining comprises using a covariance function to determine an output of closeness based on the image descriptors of the another adjusted version of the image and image descriptors of the at least one reference image as inputs to the covariance function.

9. The method of claim 7, wherein the determining comprises computing a Euclidean distance between the image descriptors of the another adjusted version of the image and image descriptors of the at least one reference image.

10. The method of claim 1, further comprising:
obtaining a summary of image features of the image as image descriptors of the image;
ranking a plurality of reference images in a reference dataset based on comparisons of the image descriptors of the image and respective image descriptors of the plurality of reference images; and
selecting a reference image with a highest rank as the similar image.

11. The method of claim 10, wherein the image descriptors of the image comprises tonal information or color tone information of the image.

12. The method of claim 10, wherein the point in the two-dimensional basis style coordinate system represents a linear combination of a plurality of basis styles.

13. One or more computer storage devices comprising computer-implemented instructions that, when used by one or more computing devices, cause the one or more computing devices to:
obtain image descriptors of a first image;
identify a reference image similar to the first image based on a comparison between the image descriptors of the first image and image descriptors of the reference images in a reference dataset; and
determine a correction parameter in a form of a point in a two-dimensional basis style coordinate system, the point in the two-dimensional basis style coordinate system representing previously stored user adjustments to the reference image; and
generate a second image based on the correction parameter applied to the first image in the two-dimensional basis style coordinate system.

14. The one or more computer storage devices of claim 13, wherein the instructions further cause the one or more computing devices to:
display the second image in a user interface implementing the two-dimensional basis style coordinate system.

15. The one or more computer storage devices of claim 14, wherein the instructions further cause the one or more computing devices to:
receive a user adjustment to the second image in the two-dimensional basis style coordinate system; and
generate a third image based on the user adjustment.

16. The one or more computer storage devices of claim 15, wherein the instructions further cause the one or more computing devices to:
obtain image descriptors of the third image;
determine the third image is within a predetermined threshold of closeness to at least one reference image in the reference dataset based on the image descriptors of the third image; and
replace adjustment parameters associated with the at least one reference image with adjustment parameters corresponding to the user adjustment.

17. The one or more computer storage devices of claim 13, wherein the instructions further cause the one or more computing devices to:
obtain image descriptors of the third image;
determine the third image is not within a predetermined threshold of closeness to any reference images in the reference dataset based on the image descriptors of the third image; and
add the third image and adjustment parameters corresponding to the user adjustment to the reference dataset.

18. A system, comprising:
a hardware processor of a machine;
an image input module to receive a first image to be adjusted;
a prediction module to determine image descriptors of the first image;
a user preference module to identify, using the hardware processor, a correction parameter in a form of a point in a two-dimensional basis style coordinate system, the point in the two-dimensional basis style coordinate system representing previously stored user adjustments for a reference image similar to the first image, and to generate a second image based on the correction parameter applied to the first image in the two-dimensional basis style coordinate system; and
a user interface module to cause the second image to be displayed in a user interface implementing the two-dimensional basis style coordinate system.

19. The system of claim 18, wherein the user interface module is further to:

receive a user adjustment to the second image in the two-dimensional basis style coordinate system; and generate a third image based on the user adjustment.

20. The system of claim 19, wherein the user preference module is further to:

obtain image descriptors of the third image;

determine the third image is within a predetermined threshold of closeness to at least one reference image in the reference dataset based on the image descriptors of the third image; and replace adjustment parameters associated with the at least one reference image with adjustment parameters corresponding to the user adjustment.

* * * * *

UNITED STATES PATENT AND TRADEMARK OFFICE
CERTIFICATE OF CORRECTION

PATENT NO. : 10,108,884 B2  
APPLICATION NO. : 15/154796  
DATED : October 23, 2018  
INVENTOR(S) : Sylvain Paris et al.

Page 1 of 1

It is certified that error appears in the above-identified patent and that said Letters Patent is hereby corrected as shown below:

In the Specification

Column 5, Line 60: Please remove "average" and replace with --average)--.

Column 11, Line 10 (Approx.): Please remove "(A.SIC)," and replace with --(ASIC),--.

Column 11, Line 15 (Approx.): Please remove "(PUP)," and replace with --(PDP),--.

Signed and Sealed this  
Second Day of July, 2019

Andrei Iancu  
*Director of the United States Patent and Trademark Office*